United States Patent Office 3,382,031
Patented May 7, 1968

3,382,031
INHIBITION OF VOLATILIZATION OF VOLATILE ORGANIC COMPOUNDS
Robert P. Cox, Madison, Wis., assignor to Omega Chemicals Corporation, a corporation of Maryland
No Drawing. Filed Dec. 12, 1961, Ser. No. 158,863
58 Claims. (Cl. 21—60.5)

This invention relates to the retardation or suspension of the volatilization of organic liquids and solids and to the resultant non-volatile compositions. More particularly, this invention relates to the process of retarding volatilization of organic compounnds by the addition thereto of small amounts of certain organic amines, amides, amidoamines, polyamines, urethans and ureas, and to the non-volatile compositions so formed.

It has been suggested to employ certain fatty alcohols, such as cetyl and stearyl, which do decrease the evaporation of water to some extent, to inhibit the evaporation of organic liquids such as benzene, styrene, acetone, methanol, etc. It was found that such fatty alcohols actually accelerated evaporation of organic liquids because their surface activity caused a phenomenon known as "wicking" in the composition, i.e., increasing the effective surface area of volatile organic liquid available to evaporate.

Somewhat more success has been achieved with physical methods of volatilization retardation. Such methods include employing special tanks and continers for holding and storing volatile organic material, floating hollow spheres of inert material on the surface of volatile organic liquids, floating a layer of foam on the surface of a volatile liquid, and interposing an incompatible, non-volatile liquid or solid barrier layer between the organic volatile material to be protected and the atmosphere. All of these methods are clumsy and of extremely limited applicability.

Quite recently, in U.S. Patent 2,764,603, it has been disclosed that the compound N,N-dimethyl-N'-perfluorocaproyl-(propylene-1,3-diamine), in minute proportions, will inhibit the evaporation of volatile hydrocarbons, such as gasoline. While quite effective with gasoline-type hydrocarbons, this compound does not retard volatilization of other common volatile organic compounds. Moreover, in actual operation, it builds up a foam layer at the surface so that the net effect is a physical method of evaporation retardation which is of limited applicability.

Accordingly, it is an object of this invention to provide a chemical method for suppressing the volatilization of highly volatile organic liquids and solids generally.

It is a further object of this invention to render such highly volatile organic liquids stable to volatilization during shipping and storage.

Another object of this invention is the suppression of noxious and otherwise disagreeable odors given off by many highly volatile organic compounds.

Still another object of this invention is the preparation of non-volatile, stable compositions from highly volatile organic liquids and solids.

Yet another object of this invention is the inhibition of the high flammability and/or explosiveness of many volatile organic compounds.

A further object of this invention is the preparation of non-odorous compositions from normally volatile organic compounds.

Still further, an object of this invention is the preparation of compositions from volatile organic compounds, which compositions are of low flammability and are explosion-stable and hence do not require the stringent precautions presently necessary during handling and storage.

Yet a further object of this invention is to increase the ease and economy of handling and storing highly volatile organic compounds by incorporating therein a small amount of a volatilization retardant which acts to reduce evaporation or sublimation and concomitantly, to suppress odors and to reduce flammability and explosive tendencies.

A specific object of this invention is the production of stable, non-volatile, non-odorous, non-flammable, non-explosive compositions from normally highly volatile organic compounds by the simple expedient of admixing therewith a small amount of a readily available stabilizer selected from a particular group of amines, amides, polyamines, amidoamines, urethans and ureas.

Another specific object of the invention is to render normally highly volatile organic compounds so stable that they can be handled and stored without elaborate precautions by the simple expedient of incorporating therein a small amount of a readily available stabilizer selected from a particular group of amines, amides, polyamines, amidoamines, urethans and ureas.

Other and further objects will appear from the ensuing detailed description.

Generally described, the objects of this invention are attained by the use, as stabilizer and volatilization retardant, of an amine, amide, polyamine, amidoamine, urethan or urea having the general formula $$R-(C_xH_{2x}NH)_n-(C_yH_{2y}-\underset{\underset{R_3}{|}}{\overset{\overset{R_4-N-R_5}{|}}{C}H})_m-R_3$$

In the formula:
R represents one of the groups,

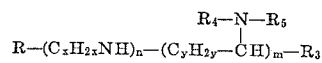

$R_1$ represents an alkyl or alkacyl radical having from about 8 to about 32 carbon atoms,
$R_2$ represents hydrogen or a lower alkyl group,
$R_3$, $R_4$ and $R_5$ each represent hydrogen, lower alkyl, hydroxy (lower alkyl), or any hydrophilic grouping such as

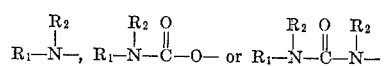

—SY, —CH$_2$SY, —OY, —CH$_2$OY, —SO$_3$Y

—CH$_2$SO$_3$Y, —PO$_4$Y$_2$, —CH$_2$PO$_4$Y$_2$, —SO$_4$Y

—CH$_2$SO$_4$Y, —PO$_3$Y$_2$, —CH$_2$PO$_3$Y$_2$

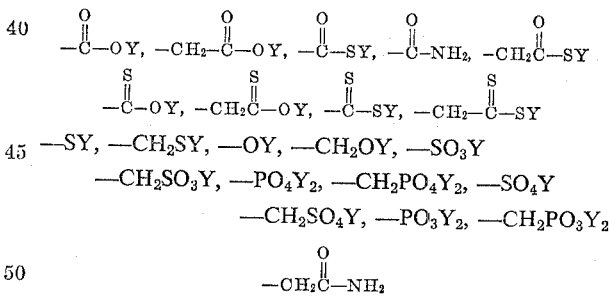

with the single proviso that at least two of $R_3$, $R_4$ and $R_5$ must be hydrogen, lower alkyl or hydroxy (lower alkyl), Y represents hydrogen, lower alkyl or a soluble salt-forming group, e.g., alkali metal, ammonium, morpholinium, pyridinium, etc., $n$ represents an integer from 0 to 5,
$m$ represents an integer from 0 to 6,
$x$ represents an integer of 1 to 6 and
$y$ represents an integer of 0 to 5.

In the definition of $R_1$, the words "alkyl" and "alkacyl" are intended to include saturated and unsaturated hydrocarbon radicals which contain no more than two double bonds and may, but preferably do not, contain some halogen substitution. If $R_1$ has a value below about 8 carbon atoms, effective inhibition of volatilization is not achieved. The invention contemplates a value for $R_1$ in the range of from about 8 up to about 32 carbon atoms. While it will be recognized that every $R_1$ value is not equally effective with every volatilizable organic compound, $R_1$ values higher than 32 carbon atoms, such as up to 40 or more carbon atoms, are effective in suppressing the volatilization of certain compounds (e.g., the volatile hydrocarbons) and the upper limit of $R_1$ is conditioned more upon the availability of compounds embodying radicals higher than $C_{32}$ than upon their efficacy in retarding volatilization.

Among the many suitable $R_1$ radicals are the natural and synthetic fully saturated hydrocarbon radicals and admixtures thereof, the unsaturated natural and synthetic hydrocarbon radicals, the acyl radicals derived from fats, fatty oils, fatty acids, etc., the synthetically produced saturated and unsaturated acyl radicals, etc. To exemplify more specifically, suitable embodiments of $R_1$ include, e.g., octyl, nonyl, decyl, undecyl, dodecyl, tridecyl, cetyl, ceryl, eicosyl, radicals derived from various synthetically produced $C_{20}$ to $C_{32}$ hydrocarbons, octenyl, octadienyl, dodecenyl, dodecadienyl, hypogeyl, hexadecenyl, hexadecadienyl, and the like. Further suitable embodiments of $R_1$ include capryl, lauryl, myristyl, palmityl, stearyl, arachidyl, behenyl, lignoceryl, cerotyl, decylenyl, dodecylenyl, palmitoleyl, hentriacontanyl, heptacosyl, octacosyl, hexacosyl, dotriacontanyl, phytadienyl, phytyl, triacontanyl, myricyl, nonacosyl, palmitolyl, brassidyl, ricinoleyl, petroselinyl, vaccenyl, linoleyl, licanyl, parinaryl, tariryl, gadoleyl, arachidonyl, cetoleyl, erucyl, nervonyl, melissyl, pelargonyl, undecanoyl, elaidyl, eleomargaryl, tridecanoyl, pentadecanoyl, margaryl, nondecanoyl, hydnocarpyl, chaulmoogryl, gorlyl and like radicals. Further examples of $R_1$ include the acyl and/or alkyl mixed radicals derived from various fats and oils, etc., such as sperm oil, whale oil, train oil, lard oil, neat's-foot oil, olive oil, cottonseed oil, red oil, coconut oil, soybean oil, oiticaca oil, tung oil, linseed oil, corn oil, perilla oil, babassu oil, palm-kernel oil, castor oil, peanut oil, rapeseed oil, palm oil, tallow, fish oils including cod oil, pilchard oil, herring oil, sardine oil, etc., hydrogenated tallow, hydrogenated corn oil, tall oil and hydrogenated tall oil, as well as radicals derived from synthetically produced mixed acids having an average number of carbon atoms in the range of from about 8 to about 32.

In the substituents $R_2$, $R_3$, $R_4$, $R_5$ and Y, when lower alkyl or hydroxy (lower alkyl) is specified, it is intended to embrace any alkyl or hydroxyalkyl radical of 1 to 6 carbon atoms. Particularly preferred substituents in each instance, however, are methyl and ethyl of the lower alkyl radicals and hydroxymethyl and hydroxyethyl of the hydroxy (lower alkyl) groups.

It is to be understood that when Y represents a soluble salt-forming group as mentioned above the quaternary ammonium radicals are positively excluded from the scope of the definition. Soluble amine salts are within the contemplation of this invention; however, quaternary ammonium derivatives of the presently disclosed inhibitors are to be avoided, not only insofar as Y is concerned, but throughout the inhibitor molecule, since quaternary ammonium compounds generally have been found to be unsatisfactory in accomplishing the objects of this invention.

The invention contemplates that any of $R_3$, $R_4$ and $R_5$ may be any known hydrophilic group so long as at least two of $R_3$, $R_4$ and $R_5$ is H, lower alkyl or hydroxy (lower alkyl). The particular hydrophilic groupings set out in detail above are intended to be exemplary rather than limiting, and to represent those most readily available.

The amount of additive necessary to achieve the desired result will, of course, vary with the particular organic material to be stabilized and the particular additive employed. Not all inhibitors are equally effective with all volatile organic compounds. In general, the effective amount of inhibitor to be added will be from about 0.005% to about 10% by weight based on the volatile organic material. A preferred range for the stabilizer is from about 0.10% to about 5.0% by weight of the volatile organic material.

Among the numerous volatile organic materials which have been found to be rendered stable to volatilization by the addition of small amounts of the amides, amines, amidoamines, polyamines, urethans and ureas contemplated by this invention are both liquid and solid, polar and non-polar materials. Among the classes of volatile materials which can be effectively protected according to this invention are aldehydes, ketones, hydrocarbons, nitriles, halogenated compounds, amines, ethers, alcohols, esters, acids, sulfides, amides, phosphines, arsines, borines, borates, nitrates, nitrites, acid halides, peroxides, oximes, nitramines, nitrosamines, metal alkyls, isocyanides, isocyanates, etc.

Specific materials which can be rendered non-volatile by treatment according to the invention include glyoxal, isovaleraldehyde, propargyl aldehyde, pyruvaldehyde, acetaldehyde, acrolein, crotonaldehyde, propionaldehyde, butyraldehyde, benzaldehyde, isobutyraldehyde, dichloroacetaldehyde, chloral, bromal, adipaldehyde, aldol, furfural, tetrahydrofurfural, acetone, methyl ethyl ketone, methyl propyl ketone, methyl vinyl ketone, alpha-bromoacetophenone, biacetyl, methyl isopropyl ketone, toluquinone, naphthoquinone, 2,6-dichloroquinone, and the like. Further volatile compounds which can advantageously be treated according to the invention are, for example: benzene, gasoline, dimethylbutene, methylbutene, ethylbutene, tetramethylethylene, beta-isoamylene, cyclopentadiene, 1,5-hexadiene, 2,4-hexadiene, 2,5-dimethyl-2,4-hexadiene, 1,5-hexadien-3-yne, hexenes, methylhexenes, isoprene, heptane, octane, naphthalene, styrene, methylstyrene, methylcyclobutane, cyclohexadiene, cyclohexene, cyclohexane, 3-methylbutadiene, 2,3-dimethylbutadiene, biisopropyl, neohexane, isopentane, 2,2,3-trimethylbutane, 3-methylbutyne, cyclopentane, 1,1-dimethylcyclopropane, dodecynes, heptynes, octynes, nonynes, hexynes, acetonitrile, propionitrile, butyronitrile, acrylonitrile, allyl cyanide, crotononitrile, isobutyronitrile, isovaleronitrile, pyruvonitrile, methacrylonitrile, vinyl iodide, methylene chloride, methylene bromide, tetrachlorodifluoroethane, trichlorotrifluoroethane, trichloroethane, tribromoethane, dichloroethylene, perchloroethylene, isopropyl bromide, isopropyl chloride, allyl iodide, amyl fluoride, benzal fluoride, allyl chloride, ethyl chloride, trichloroethylene, benzyl iodide, bromoform, tertiary-amyl chloride, ethylene dichloride, ethylene dibromide, trichloromonofluoromethane, dichlorobenzene, carbon tetrachloride, isopropyl iodide, diiodoacetylene, allyl bromide, chloroform, chloroprene, alpha-bromostyrene, and the like.

Still further examples include diethylamine, dipropylamine, dibutylamine, diallylamine, morpholine, propylenediamine, monobutylamine, trimethylamine, putrescine, cadaverine, allylamine, amylamine, N-methyl-ortho-nitroaniline, tributylamine, difurfurylamine, ethoxyethylamine, ethylenediamine, isopropylamine, piperidine, piperazine, pipecoline, picoline, pyridine, pyrazine, pyrimidine, pyrrole, ethylpyrrole, methylpyrrole, 2-quinolinol, tetrazine, tetrazole, tetryl, trimethylenimine, amyl nitrite, butyl nitrite, secondary butyl nitrite, tertiary butyl nitrite, isoamyl nitrite, ethylene nitrite, formaldoxime, acetoxime, ethyl isocyanide, ethyl nitrate, azoxybenzene, ethylenimine, nitrosobenzene, diethylnitrosamine, nitrobenzene, naphthylamine, naphthoquinone, diethylnitramine, dimethylnitrosamine, nitroethane, ethoxyamine, acetonylurea, diacetylurea, dimethylformamide, melamine, phenacetin, acetamide, ethyl hydrazine, methylhydrazine, dimethylhydrazine, phenylhydrazine, furfuramide, beta-methylhydroxylamine, ethyl isocyanate, isobutyl isocyanate, isopropyl isocyanide, isopropyl nitrite, isopropyl nitrate, 2,6-lutidine, dinitromethane, nitromethane, tetranitromethane, chloropicrin, methyl nitrate, trinitromethane, nitroglycerine, nitropropane, propylnitramine, dinitrotoluene, trinitrotoluene, ethyl isothiocyanate, methyl isothiocyanate, methyl thiocyanate, isoamylthiocyanate, ethyl borate, dimethyl sulfoxide, ethyl sulfoxide, methyl sulfite, thiophosgene, dichloromethylarsine, diethylarsine, dimethylarsine, ethylarsine, trimethylarsine, triethylborine, triisoamylborine, tripropylborine, cacodyl chloride, diethylphosphine, dimethylphosphine, triethyl phosphine sulfide, triethylphosphine, trimethylphosphine, etc.

Additional volatile compounds whose properties are improved by treatment according to this invention are: triethyl aluminum, diethyl cadmium, diethyl tellurium, tetramethyl lead, dimethyl mercury, methyl mercuric chloride, diethyl zinc, dimethyl zinc, dimethyl selenide, dimethyl telluride, triethyl stibine, trimethyl stibine, tetramethyl tin, triisoamyl tin chloride, acetyl peroxide, perbenzoic acid, vinylether, nitrofuran, diisopropyl ether, ethylal, tetrahydropyran, diethyl ether, allyl ethyl ether, allyl methyl ether, bis (chloromethyl) ether, ethyl vinyl ether, acetal, dioxane, furan, petroleum ether, propylene oxide, methylal, butyl methyl ether, 2-methyldioxolane, bioxirane, 2-ethoxyethanol, 2-methoxyethanol, isobutylene oxide, chlorofuran, furfuryl chloride, dimethylfuran, iodofuran, methylfuran, epichlorohydrin, ethanol, isopropanol, butanol, methanol, allyl alcohol, 2-nitrobutanol, ethylvinylcarbinol, allylmethylcarbinol, methylvinylcarbinol, saligenin, butenol, trinitrophenol, trinitrocresol, 2-chloroethanol, 2-fluoroethanol, 3-methyl-3-hexynol, isoamyl alcohol, methyl formate, bornyl acetate, methyl butyrate, methyl carbonate, amyl furoate, ethyl furoate, allyl acetate, ethyl acetate, methyl salicylate, vinyl acetate, isopropyl acetate, propyl acetate, isobutyl acetate, propargyl acetate, methyl acetate, ethyl formate, vinyl formate, benzyl acrylate, ethyl acrylate, methyl acrylate, cyclohexyl acrylate, trichloromethyl chloroformate, allyl formate, cyanoethyl formate, amyl beta-furylacrylate, isoamyl isobutyrate, methyl methacrylate, ethyl methacrylate, propyl methacrylate, ethyl thiolcarbamate, ethyl thionocarbamate, butyric acid, acetic acid, propionic acid, the "goat" acids (i.e., caprylic, caproic and capric acids), propargylic acid, vanillic acid, salicylic acid, pyruvic acid, allylacetic acid, vinylacrylic acid, cyanoacetic acid, bromoacetic acid, chloroacetic acid, fluoroacetic acid, iodoacetic acid, the various di- and tri- (halo) acetic acids, thiolacetic acid, alpha-chloroacrylic acid, para-hydroxybenzoic acid, vinylacetic acid, alpha-ketobutyric acid, furoic acid, isethionic acid, leucic acid, maleic acid, malic acid, acetyl bromide, acetyl chloride, benzoyl bromide, benzoyl chloride, acetyl iodide, acrylyl chloride, adipyl chloride, benzenesulfonyl chloride, butyryl chloride, carbamyl chloride, furoyl chloride, isovaleryl chloride, oxalyl chloride, carbon disulfide, allyl sulfide, butyl mercaptan, isoamyl mercaptan, divinyl sulfide, thiophene, tertiary amyl mercaptan, ethanedithiol, ethyl mercaptan, dimethyl sulfide, diethyl sulfide, ethylene sulfide, isopropyl mercaptan, methyl sulfide, and like compounds.

In addition to inhibiting the volatilization of simple organic compounds, it is contemplated according to the invention to inhibit the volatilization of volatile ingredients from organic plastics and resinous materials such as, e.g., styrene-modified polyesters. Moreover, the evaporation of mixtures such as volatile oils consisting essentially of volatile terpenes, ketones, aldehydes, alcohols and esters can be inhibited according to this invention. Such oils include oil of angelica, oil of cloves, oil of wintergreen, oil of anise, oil of asarum, oil of caraway, oil of balm, oil of camphor, oil of bitter orange, oil of basil, oil of bay, oil of bergamot, oil of calamus, oil of cajuput, oil of cascarilla, oil of cedar wood, oil of celery, oil of chamomile, oil of peppermint, oil of wormwood, oil of chenopodium, oil of white cedar, oil of champaca, oil of turpentine, oil of cinnamon, oil of citronella, oil of valerian, oil of cherry laurel, oil of tansy, oil of sweet bay, oil of copaiba, oil of geranium, oil of coriander, oil of thyme, oil of cubeb, oil of garlic, oil of dill, oil of mountain pine, oil of cypress, oil of fennel, oil of cumin, oil of eucalyptus, oil of fir, oil of fleabane, oil of ginger, oil of spike, oil of hops, oil of lemon, oil of spearmint, oil of hyssop, oil of juniper, oil of lavender, oil of savin, oil of nutmeg, oil of lemon grass, oil of marjoram, oil of linaloe, oil of male fern, oil of parsley, oil of sassafras, oil of matico, oil of horsemint, oil of origanum, oil of myrtle, oil of pennyroyal, oil of sweet orange, oil of orange flowers, oil of niaouli, oil of pepper, oil of rosemary, oil of rose, oil of pimento, oil of rue, oil of santal, oil of pine needles, oil of pettitgrain, oil of yarrow, and the like.

Inasmuch as all inhibitors are not equally effective with all volatile organic compounds, it is also possible to design a system in which evaporation or volatilization of one compound will be preferentially retarded or suppressed.

Moreover, as will readily be recognized, numerous desirable side effects occur incidental to the suppression of evaporation or sublimation by the inhibitors of this invention. For example, various inflammable liquids which have previously required elaborate precautions during storage can, when treated with the inhibitors of this invention, be stored in open containers without substantial risk. This will find particular application not only in storage facilities themselves but also in the operation of dry cleaning plants and in de-greasing methods which employ solvents. In addition, it has been found that the effectiveness of dry cleaning and de-greasing solvents is increased concomitant with and incident to the inhibition of their volatilization. It is thus apparent that not only is the safety of the operation greatly increased, but is it rendered far more economical.

Medicinal oils, such as oil of wintergreen and oil of cloves, gain not only increased shelf life by being rendered stable to volatilization, but also are rendered more pleasant to use by reason of the concomitant elimination of their present objectionable odors and are further characterized by enhanced efficacy so that smaller applications will give the same result as previously attained with large and odorous quantities.

Volatile reactive ingredients such as styrene may be maintained in polymerization systems without the use of awkward and complicated special equipment when treated in accordance with this invention. Moreover, styrene-modified resins and polymers can be spray molded on hot forms without substantial loss of volatile ingredients if they are previously pre-treated in accordance with this invention.

Moth repellents, such as napthalene and dichlorobenzene, will gain increased shelf life and their objectionable odors are reduced to an almost imperceptible point when they are treated in accordance with the invention.

Various liniments and other topically applied substances, e.g., rubbing alcohol, are rendered more efficient, less odorous, and given longer effectiveness by treating them in accordance with the invention.

Various substances which are presently known to be characterized by noxious odors, e.g., isoamyl alcohol, carbon disulfide, mercaptans, and alkyl diamines, are not only rendered stable to volatilization but also almost nonodorous when treated in accordance with the invention. This constitutes a boon to laboratory workers, for many reactions which have previously been difficult or impossible to run without special equipment can now be conducted easily.

It has also been found that loss of volatile organic materials through small leaks in storage systems is substantially eliminated when the volatile materials are treated in accordance with the present invention. For example, in gasoline storage systems, the occurrence of this phenomenon not only eliminates expensive waste of the gasoline but it greatly reduces the ignition danger presently recognized to attend such leaks. This also finds application, inter alia, in automobile radiator systems containing antifreezes and in various other storage facilities where small holes have previously caused loss of a substantial portion of volatile material.

In polymerization and other chemical reaction systems employing volatile metal alkyl catalysts, it is possible, by the practice of this invention, to avoid the use of special and expensive equipment and techniques previously used to prevent access of air to the system. It will, of course, be understood that the volatilization inhibitor must be selected in such manner as to preclude the presence of any group that may react with the metal alkyl. It is contemplated, moreover, that the inhibitor be so selected as to constitute an initiator for the polymerization reaction or other reaction to be catalyzed and, hence, to avoid extraneous contaminants in the final product.

Various commonly used materials which commonly "dry out," thicken or evaporate completely after being opened can, if treated according to the invention, be given prolonged useful lives. Such materials include, inter alia, shoe polishes and waxes, paints, lacquers, enamels, nail polishes, inks, perfumes, colognes, antiseptics, glues, hair tonics and conditioners, alcoholic beverages, cosmetic creams and lotions, air fresheners, flavoring agents such as vanilla and lemon extracts, car and furniture waxes, metal polishes, sun lotions and screening agents, pesticidal materials, and the like. It is pointed out that, while such materials as perfumes and colognes which are desired to exhibit a fragrance are rendered stable to volatilization during storage, nevertheless, if, e.g., the bottle is shaken before application to the skin or the substance is sprayed from the bottle, they still retain their desirable aroma. In other words, the practice of this invention inhibits odor only to the extent it inhibits evaporation; it does not deodorize per se.

Normally volatile materials which are subject to explosion and/or spontaneous ignition when their vapors become admixed with air are, if treated according to this invention, rendered substantially non-volatile and, hence, relatively safe for ordinary handling and storing. This is exceptionally advantageous insofar as acetylenic compounds, nitro and nitroso compounds, organic nitrates and nitrites and the like are concerned.

The mechanism of the inhibition of volatilization according to this invention is not presently completely understood. It appears, however, that volatilization inhibition according to this invention takes place by a mechanism which is the reverse of Langmuir's theory explaining the inhibition of water evaporation by materials such as fatty acids and fatty alcohols. Thus, Langmuir employed compounds which exhibited a hydrophilic head and a hyprophobic tail; the head being attracted toward the water and the tail being repelled by the water. The molecules of the compound were propelled by these forces to form a layer at the surface of the water with the tail being directed toward the surface, that is away from the liquid. In the present invention the inhibitors which have been found to be effective are characterized by having an oleophilic, i.e., hydrophobic tail and an oleophobic, i.e., hydrophilic head. Again the effect of these forces acting on the molecules of the inhibitors results in formation by the compound of a barrier layer at the surface with the tail portion of the molecule directed toward the organic liquid and the head portion of the molecule being directed away from the organic liquid, that is, toward the surface of the liquid. Thus, the apparent result is a formation of a double interlocking barrier layer, or "molecular sheath," which exhibits a "microcrystalline" behavior and is most effective in inhibiting volatilization, even though the orientation of the head and tail portions of the molecule is the reverse of that which Langmuir and subsequent workers found effective in inhibiting volatilization of water. Despite the fact that in order to inhibit evaporation of water it has been found desirable to form a barrier layer with the tail portion of the molecule oriented toward the surface, in order to prevent the evaporation of an organic liquid, it now appears that a double barrier layer wherein the head is oriented toward the surface and the tail away from it is far more efficient and beneficial.

This phenomenon is also contrary to that observed by Ahlbrecht (U.S. Patent 2,764,602) with perfluoro amido amines, in that the perfluoro alkyl tail is both hydrophobic and oleophobic and instead of orienting at the surface of the volatile compound, and apparently forming a strong bond therewith by some presently unappreciated mechanism, this tail initially orients over the surface. In action, moreover, the Ahlbrecht compounds foam at the surface and produce a physical, rather than a chemically oriented, barrier. Hence, its action is, in general, not as strong as that achieved by the formation of a double-barrier layer or molecular sheath in accordance with this invention. This hypothesis is in no way intended to be limiting. It represents what appears to be the most likely mechanism of the observed phenomena, but this has not been experimentally proved. It is thus submitted as a probable explanation rather than an absolute truism. While the theory is elucidated above with reference to volatile organic liquids, it applies equally to volatile organic solids and it is to be understood as intended to do so.

The barrier layer or molecular sheath formed at the surface of the volatile organic compound according to this invention can be disrupted by mechanical agitation, the effect of wind, ultrasonic vibration, spraying and similar forces. Immediately upon cessation of agitation, however, the molecular sheath re-forms on the surface and continues to protect the volatile compound.

When volatile organic liquids having refrigerant properties are treated in accordance with this invention, it is thus possible by judicious application of mechanical agitation to achieve a highly efficacious and economical mechanical refrigeration process.

Similarly, when volatile organic corrosion inhibitors for metals, e.g., nitrides, sulfides, etc., are treated in accordance with the invention, their action can also be mechanically controlled by judicious application of mechanical agitation.

When the volatile material to be proetcted is a relatively polar water-soluble organic liquid, the effectiveness of a given additive in inhibiting volatilization appears to depend to some extent upon the relative humidity of the atmosphere. On a dry day, the amide of ethylene triamine and a $C_{15}$ to $C_{17}$ acid gives excellent results with methanol showing an evaporation rate of less than .01 gram per hour per unit surface area, but on a humid day, the same additive is less effective, showing a loss from 0.10 to 0.21 gram per hour per unit area. It appears that a surface solution of water and polar liquid is formed in the presence of humidity and that this, at least to some extent, disrupts the action of the molecular sheath upon the surface of the volatile compound. In contradistinction, the results with volatile non-polar liquids such as benzene, carbon tetrachloride, diethyl ether, etc., are independent of humidity and are reproducible no matter what the atmospheric conditions.

Having generally described the invention, the following examples are given by way of specific illustration:

Examples 1–12

A series of straight chain organic acids was reacted with a 1000% molar excess of diethylene triamine to yield compounds having the following general structure:

The carbon content of the R group was varied from 11–21 by appropriate choice of the acid used. These products were added in 1% concentration to a series of volatile organic liquids, and the volatility of the resultant solutions was determined and compared with corresponding figures for the pure liquids by the following technique:

Ten grams of the organic liquid or solution were weighed out into open aluminum dishes having a cross-sectional area of 4 square inches. These were weighed periodically to determine the weight remaining as a function of time (the weight of the dish was subtracted from the total weights to give the above figures). The ambient atmospheric conditions were constant for these experiments and were as follows: Temperature: 82° F.; relative humidity: 45%; barometric pressure: 30.1 inches of mercury. Over a ten-hour period the evaporation rates in grams per square inch of exposed surface area were determinated. They are summarized in Table 1 below:

TABLE 1

| Example Nos. | R= | Methanol Evaporation Rate | Benzene Evaporation Rate |
|---|---|---|---|
| 1 and 2 | $C_{11}H_{23}$ | .025 | .005 |
| 3 and 4 | $C_{13}H_{27}$ | .015 | .003 |
| 5 and 6 | $C_{15}H_{31}$ | .012 | .002 |
| 7 and 8 | $C_{17}H_{35}$ | .014 | <.002 |
| 9 and 10 | $C_{21}H_{43}$ | .015 | .004 |
| 11 and 12 | $C_{17}$ (oleic) | .018 | .0035 |
| | Control (no additive) | .45 | .625 |

Examples 13–33

The compound having the formula

$$C_{17}H_{35}-\overset{O}{\underset{\|}{C}}-NH-CH_2CH_2-NH-CH_2CH_2NH_2$$

was added in 1% concentration to a variety of normally volatile organic liquids. The ratios of the steady state evaporation rates of these 1% solutions to those of the pure liquids are given in Table 2. A method for measuring the steady state evaporation rates was decribed previously with regard to Examples 1–2.

TABLE 2

| Example Nos. | Liquid | Ratio (Evaporation Rate of Solution)/(Evaporation Rate of Pure Liquid) |
|---|---|---|
| 13 | Acetaldehyde | .049 |
| 14 | Acetone | .045 |
| 15 | Acetonitrile | .041 |
| 16 | Acrolein | .047 |
| 17 | Allyl chloride | .0095 |
| 18 | Diethyl amine | .010 |
| 19 | Diethyl ether | .006 |
| 20 | Dioxane | .009 |
| 21 | Epichlorohydrin | .015 |
| 22 | Ethanol | .035 |
| 23 | Ethyl chloride | .0055 |
| 24 | Furan | .020 |
| 25 | Isopropanol | .025 |
| 26 | Methyl ethyl ketone | .020 |
| 27 | Methyl formate | .006 |
| 28 | Propylene oxide | .009 |
| 29 | Styrene | .006 |
| 30 | Trichloroethylene | .006 |
| 31 | Trichloro mono fluoro methane | .0065 |
| 32 | Trimethyl amine | .016 |
| 33 | Vinyl acetate | .0055 |

Examples 34–39

The following materials were tested as evaporation inhibitors for benzene, using the techniques outlined in Examples 1–6:

(1) $C_{17}H_{35}-\overset{O}{\underset{\|}{C}}-NH-C_2H_4-NH-C_2H_4NH-C_2H_4NH_2$ (2) $C_{17}H_{35}-CO-NH-C_2H_4-NH_2$ (3) $C_{17}H_{35}-CO-NH-C_3H_6-NH_2$ (4) $C_{17}H_{35}-CO-NH-C_4H_8-NH_2$ (5) $C_{17}H_{35}-CO-NH-C_6H_{12}-NH_2$ (6) $C_{17}H_{35}-CO-NH-C_2H_4N(CH_3)_2$ For 1% solutions, the ratios of the equilibrium evaporation rates to that of pure benzene are given in Table 3 below:

TABLE 3

| Example Nos. | Additive | Ratio (Evaporation Rate of 1% Solution)/(Evaporation Rate of Benzene) |
|---|---|---|
| 34 | 1 | .010 |
| 35 | 2 | .021 |
| 36 | 3 | .017 |
| 37 | 4 | .009 |
| 38 | 5 | .019 |
| 39 | 6 | .29 |

Example 40

.1 g. of the reaction product of stearic acid and diethylene triamine was added to 9.9 g. of benzene and the resulting solution was found to ignite only when agitated. By contrast, pure benzene ignited readily on contact with an open flame.

The above experimented solution was found to be superior to pure benzene as a dry cleaning solvent and degreaser and was at least equivalent to trichloroethylene in these applications.

Examples 41 and 42

.1 g. of the reaction product described in Example 40 was added to 9.9 g. of a styrene-modified polyester resin (Vibrin 158A of Naugatuck Chemical Division of U.S. Rubber Co.). The rates of styrene depletion of this mixture and of an unmodified styrene-resin mixture are given in Table 4, where the weight remaining of the original 10-gram sample is tabulated as a function of time.

TABLE 4

| Time | 0% Additive | 1% Additive |
|---|---|---|
| 0 minutes | 10.00 | 10.00 |
| 15 minutes | 9.93 | 9.97 |
| 45 minutes | 9.81 | 9.96 |
| 90 minutes | 9.70 | 9.95 |
| 120 minutes | 9.61 | 9.95 |
| 4 hours | 9.45 | 9.95 |
| 24 hours | | 9.92 |
| 48 hours | 7.85 | 9.90 |
| 96 hours | | 9.87 |

Unmodified Vibrin 158A was then combined with 1% benzoyl peroxide and .1% dimethyl aniline and cured in an open cup for 2 hours at 40° C., followed by 6 hours at 100° C. Since the product was weak and frangible, it was obvious that the styrene evaporation from the surface was sufficient to deplete this material to the point where a proper cure could not be attained.

When the above experiment was repeated with Vibrin 158A containing 1% of the reaction product of stearic acid and diethylene triamine, a fully cured and fully satisfactory product was obtained.

Examples 43–47

.25 g. of the reaction product of stearic acid and diethylene triamine were combined with 9.75 g. of Ucon 11 (trichloro mono fluoro methane available from Union Carbide Corp.). Periodic weighing of this composition and of an unmodified "control" sample reveal the following:

TABLE 5

| Time | Control | $CCl_3F$ Containing 1% Additive |
|---|---|---|
| 0 hours | 10.00 | 10.00 |
| 1 hour | 9.11 | 9.9 |
| 4 hours | 4.23 | 9.88 |
| 24 hours | 0.00 | 9.81 |

The temperature of the modified material was then measured when (a) at rest, and (b) when agitated by stirring. These results are as follows:

°C.
Room temperature _____ 24.8
Temperature of static solution _____ 24.5
Temperature of agitated solution _____ 10.2

Similar results were obtained when diethyl ether, ethyl chloride, hexane and acetone were used as the solvent.

Thus, the rate of evaporation and, therefore, the evaporative cooling rate of refrigerants has been controlled by (a) admixture with the above additive, and (b) agitation.

Examples 48–50

.1 g. of oleyl amide (Adogen 73 from Archer-Daniels-Midland Co. or Kemstrene Amide U from Humco Products Co.) were added to 9.9 g. of methanol, isopropanol and butanol. The steady state evaporation rates for these solutions and for the pure solvents were as follows:

TABLE 6

| Example Nos. | Composition | Evaporation Rate |
| --- | --- | --- |
| 48 | Pure methanol | .49 g. loss/hr./sq./inch. |
|  | Methanol plus oleylamide | .005 g. loss/hr./sq. inch. |
| 49 | Isopropanol | .36 g. loss/hr./sq. inch. |
|  | Isopropanol plus oleylamide | .002 g. loss/hr./sq. inch. |
| 50 | Butanol | .23 g. loss/hr./sq. inch. |
|  | Butanol plus oleylamide | .001 g. loss/hr./sq. inch. |

The above experiments were performed on different days, under different conditions of temperature and relative humidity. However, the data for the particular "controls" and experimental samples were obtained under identical experimental conditions. Also, the two commercial types of oleylamide (Kemstrene Amide U and Adogen 73) yielded identical results.

Example 51

Adogen 60 is a cocoamide available from Archer-Daniels-Midland Co. It is composed primarily of $C_{12}$ and $C_{14}$ fatty acid amides.

When .1 g. of this material was added to 9.9 g. of benzene, the steady state evaporation rate was found to be .041 g. loss/hour/square inch. This is in contradistinction to a value of .500 g. loss/hour/square inch for unmodified benzene.

Examples 52A and 52B

.1 g. of Kemstrene Amides B and S (Behenamide and Stearamide, respectively, available from Humco Products Co.) were added to 9.9 g. samples of methanol and weighed periodically. The steady state evaporation rates were found to be .001 and .02 g./hour/square inch, respectively. These values are much lower than the figure of .49 g. loss/hour/square inch for pure methanol.

Examples 53–55

.1 g. of each of the following materials were combined with 9.9 g. of benzene:

C. P. Hall Co.—
  Halcomid M–14 ____. N,N dimethyl myristamide.
  Halcomid M–18 ____. N,N dimethyl stearamide.
  Halcomid M–18–OL . N,N dimethyl oleylamide.

The steady state evaporation rates for these compositions and for an unmodified benzene control were as follows:

TABLE 7

| Example Nos. | Additive | Evaporation Rate |
| --- | --- | --- |
| Control | None | .50 g. loss/hr./sq. inch. |
| 53 | 1% M–14 | .175 g. loss/hr./sq. inch. |
| 54 | 1% M–18 | .175 g. loss/hr./sq. inch. |
| 55 | 1% M–18–OL | About .40 g. loss/hr./sq. inch. |

Example 56

.1 g. of the reaction product of stearic acid with excess diethylenetriamine was combined with 9.9 g. of "oil of wintergreen" (active ingredient: methyl salicylate). Unless agitated, the material did not volatilize readily. Thus, its effects when used in topical application were longer-lasting than those of unmodified "oil of wintergreen" and the penetrating odor of the latter was almost completely absent.

Example 57

Moth crystals (naphthalene) were melted and combined with 1% by weight of A–34

$$(R-CO-NH-C_2H_4-NH-C_2H_4NH_2)$$

where R is essentially $C_{17}H_{35}$, available from Nalco Chemical Co.). On re-fracturing the cooled mass and weighing periodically, it was found that the sublimation rate was only 15% of that observed with unmodified moth repellent. That this decreased volatilization did not decrease the effect in repelling moths indicates that only traces of naphthalene vapor are necessary to repel moths, that present products are wasteful, and that addition of small amounts of A–34 and similar compounds improve moth-repellent products both by increasing their service life and by decreasing their objectionable odor.

Examples 58–62

.25 g. of Adogen 101D (a distilled fatty amine containing 18–20 carbon atoms, available from Archer-Daniels-Midland Co.) was added to 9.75 g. of Ucon 11 (trichloro mono fluoro methane available in propellent and refrigerant grades from Union Carbide and Carbon Corp.). Periodic weighing of this sample and of a control (Ucon with 0% Adogen 101D) revealed the following information:

TABLE 8

| Time | Control (weight), g. | 2.5% Adogen 101D (weight), g. |
| --- | --- | --- |
| 0 hours | 10.00 | 10.00 |
| 2 hours | 0.00 | 9.93 |
| 24 hours |  | 9.52 |

Thus, it was seen that the addition of 2.5% Adogen 101D almost completely eliminated the evaporation of this normally highly volatile refrigerant.

Next, the temperature of the modified refrigerant was measured before, during and after stirring. These results were as follows:

|  | ° C. |
| --- | --- |
| Before stirring | 25.5 |
| During stirring | 8.1 |
| 10 minutes after cessation of stirring | 25.3 |

The ambient temperature of the room was 25.8° C.

Similar results were obtained when diethyl ether, ethyl chloride, acetone, and hexane were used as the refrigerant-solvent.

Thus, the rate of evaporation and, hence, the evaporative cooling rate of refrigerants has been controlled by (a) admixture with Adogen 101D, and (b) agitation. In effect, mechanically controlled refrigeration was the result.

When other aliphatic amines and polyamines were substituted for Adogen 101D in the above experiment, all were found to be effective to some extent. Adogen 501, for example, decreased the volatility of the $CCl_3F$ by a factor of 300%.

Examples 63–128

A series of amines and diamines were screened for effect on the volatility of methanol, petroleum ether and benzene. In these experiments, 10 g. of a 1% solution of the particular amine was weighed out into an aluminum dish and weighed periodically. It was found that these additives selectively migrated to the liquid surface to form an extremely thin surface covering. That interference patterns were obtained indicated that the layer was mono or dimolecular in thickness. After the first few minutes, the evaporation rate assumed a constant value and was calculated by weighing the modified sample at that time when all of the unmodified control had evaporated, subtracting from this figure the weight after an additional ten hours, and dividing the difference by ten. The dashes in the table indicate combinations that were superior to the "control" but inferior to the best combinations.

| Example Nos. | Trade Name | Composition | Evaporation Rate (grams/hr./4 sq. in. surface area) | | |
|---|---|---|---|---|---|
| | | | Methanol | Benzene | Petroleum Ether |
| 63–65 | Diamine 26 | R—NH—CH$_2$—CH$_2$—CH$_2$—NH$_2$ R=Tallow. | .06 | | |
| 66–68 | DIAM 21 | R—NH—CH$_2$—CH$_2$—CH$_2$—NH$_2$ R=Coco. | .41 | .74 | |
| 69–71 | Adogen 501 | R—NH—CH$_2$—CH$_2$—CH$_2$—NH$_2$ R=C$_{16}$–C$_{22}$. | 1.00 | <.01 | .53 |
| 72–74 | Adogen 560 | R—NH—C$_3$H$_6$—NH$_2$ R=C$_{12}$–C$_{14}$. | .41 | | |
| 75–77 | Adogen 570 | R—NH—C$_3$H$_6$—NH$_2$ R=C$_{16}$–C$_{18}$ plus 45% oleyl. | <.01 | | |
| 78–80 | Adogen 101D | C$_{18}$–C$_{22}$ Amine | .91 | .30 | |
| 81–83 | Adogen 140 | C$_{16}$C$_{18}$ Amine | | .76 | .45 |
| 84–86 | Alamine 21 | Coconut Oil Amine (C$_{12}$–C$_{14}$) | | .55 | |
| 87–89 | Alamine 11 | Oleyl Amine | 1.00 | .71 | |
| 90–92 | Alamine 4 | Lauryl Amine (C$_{12}$) | | .78 | |
| 93–95 | Alamine 126 | Hydrogenated Tallow Amine (C$_{18}$) | | .81 | |
| 96–98 | Adogen 160 | Cocoamine (C$_{12}$–C$_{14}$) | | .75 | |
| 99–101 | Adogen 140D | C$_{16}$–C$_{18}$ Amine | | .76 | |
| 102–104 | Adogen 361 | Tall Oil Fatty Amine | | | |
| 105–107 | Alamine 26 | Tallow Amine | | | |
| 108–110 | Alamine 5 | Myristyl Amine | | | |
| 111–113 | Adogen 240 | Dihydrogenated Tallow Diamine | | | |
| 114–116 | Adogen 156D | Behenyl Amine (C$_{22}$) | | | |
| 117–119 | Adogen 141D | Palmityl Amine (C$_{16}$) | | | |
| 120–122 | Adogen 163D | Lauryl Amine (C$_{12}$) | | | |
| 123–125 | Adogen 142D | Stearyl Amine (C$_{18}$) | | | |
| 126–128 | Control (no additive) | | 1.95 | 2.00 | 2.00 |

Example 129

2.5 g. of Adogen 501 (Archer-Daniels-Midland Co.; a fatty diamine having the structure

R—NH—CH$_2$—CH$_2$—CH$_2$NH$_2$ where R is C$_{16}$–C$_{22}$) was added to 97.5 g. of benzene and used as a de-greasing and dry cleaning solvent. When in the cleaning vat, the solution was non-evaporative and relatively non-flammable. It was only when the de-greased part or dry cleaned cloth was removed that the exposed surface area was sufficient to permit evaporation. In the latter case, the materials did dry and, incidentally, could easily be ignited by an open flame or spark.

Thus, it is seen that the addition of this compound has utility in the cleansing industries, since the prime fire hazard associated with vats of potentially flammable liquids is greatly decreased.

In addition, the cleansing action of the benzene was found to have been greatly increased because of the surface-active detergent of the additive.

Examples 130 and 131

.1 g. of Adogen 101D (a distilled arachidyl-behenyl amine) and 501 (an arachidyl-behenyl diamine) were added to 9.9 g. samples of melted naphthalene. After mixing and cooling, the products were comminuted to fine powders and the sublimation rates compared with that of pure naphthalene. At the time when 10 g. of naphthalene had sublimed (temperature about 40° C.), the above experimental samples weighed 8 g. and 9.1 g., respectively.

Both of these experimental compositions were found to repel moths as effectively as the unmodified material.

Since similar results were obtained with p-dichlorobenzene as the base material, it must be concluded that present materials used for repelling moths are grossly wasteful and that the addition of minor percentages of the above additives increases the service life of moth repellents and decreases their odor without affecting their usefulness.

Example 132

.1 g. of Adogen 101D and 501 were combined with 9.9 g. samples of "oil of wintergreen" (active ingredient: methyl salicylate). Unless agitated, these materials did not volatilize readily. Thus, the effects when used in topical application were longer-lasting than those of unmodified "oil of wintergreen" and the penetrating odor of the latter was almost completely absent.

Examples 133–147

Octadecyl isocyanate (from the Carwin Co.) was reacted in a conventional manner with excesses of each of the following materials:

| Reactant | Probable Reaction Product |
|---|---|
| (a) Ethanolamine | C$_{18}$H$_{37}$—NH—$\overset{\text{O}}{\underset{\|}{\text{C}}}$—O C$_2$H$_4$NH$_2$ |
| (b) N-Propanolamine | C$_{18}$H$_{37}$—NH—$\overset{\text{O}}{\underset{\|}{\text{C}}}$—O C$_3$H$_6$NH$_2$ |
| (c) Ethylene diamine | C$_{18}$H$_{37}$—NH—$\overset{\text{O}}{\underset{\|}{\text{C}}}$—NHC$_2$H$_4$NH$_2$ |
| (d) Propylenediamine | C$_{18}$H$_{37}$—NH—$\overset{\text{O}}{\underset{\|}{\text{C}}}$—NHC$_3$H$_6$NH$_2$ |
| (e) Hexylene diamine | C$_{18}$H$_{37}$—NH—$\overset{\text{O}}{\underset{\|}{\text{C}}}$—NHC$_6$H$_{12}$NH$_2$ |
| (f) Diethylene triamine | C$_{18}$H$_{37}$—NH—$\overset{\text{O}}{\underset{\|}{\text{C}}}$—(NHC$_2$H$_4$)$_2$NH$_2$ |
| (g) Triethylene tetramine | C$_{18}$H$_{37}$—NH—$\overset{\text{O}}{\underset{\|}{\text{C}}}$—(NHC$_2$H$_4$)$_3$NH$_2$ |
| (h) Glycineamide | C$_{18}$H$_{37}$—NH—$\overset{\text{O}}{\underset{\|}{\text{C}}}$—NH—CH$_2$—$\overset{\text{O}}{\underset{\|}{\text{C}}}$—NH$_2$ (H$_2$N—CH$_2$—$\overset{\text{O}}{\underset{\|}{\text{C}}}$—NH$_2$) |

In the cases where both hydroxyl and amino groups were present in the reactant, it is believed that only the hydroxyl group was reacted because the dilution was great enough (500%) to prevent multiple reaction and because, in the case of (a) and (b) above, the amine group was tied up as the hydrochloride during the reaction and regenerated by subsequent treatment with sodium bicarbonate.

1% of each of the above reaction products was added to benzene and methanol samples and tested as in Examples 1–12. The results are set forth in Table 10 below, in which the evaporation rate is set forth as a percentage of the evaporation rate of a control (pure liquid; no additive) under the same conditions:

TABLE 10

| Example Nos. | Additive | Evaporation Rate (Pure Liquid)/(Liquid and Additive), Calculated as Percent | |
|---|---|---|---|
| | | With Benzene | With Methanol |
| 133–134 | (a) | 30 to 40 | 20 to 30. |
| 135–136 | (b) | 30 to 40 | 20 to 30. |
| 136–137 | (c) | 10 to 20 | 10 to 20. |
| 138–139 | (d) | 20 to 30 | Less than 10. |
| 140–141 | (e) | 40 to 50 | 40 to 50. |
| 142–143 | (f) | 20 to 30 | 10 to 20. |
| 144–145 | (g) | 10 to 20 | 20 to 30. |
| 146–147 | (h) | Less than 10 | 30 to 40. |

What is claimed is:

1. A process for inhibiting the volatilization of a normally volatile organic substance essentially free of water which comprises adding thereto from about 0.005% to about 10% by weight of a volatilization inhibitor having the general formula

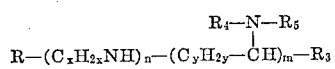

wherein R is selected from the group consisting of

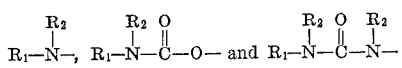

$R_1$ is a radical having from about 8 to about 32 carbon atoms and is selected from the group consisting of alkyl and alkacyl radicals, $R_2$ is selected from the group consisting of hydrogen and lower alkyl radicals, two of $R_3$, $R_4$ and $R_5$ are selected from the group consisting of hydrogen, lower alkyl and hydroxy (lower alkyl), the other of $R_3$, $R_4$ and $R_5$ is selected from the group consisting of hydrogen, lower alkyl, hydroxy (lower alkyl) and hydrophilic groups, $n$ is an integer of from 0 to about 5, $m$ is an integer of from about 0 to about 6, $x$ is an integer of from about 1 to about 6, and $y$ is an integer of from 0 to about 5.

2. The process of claim 1 wherein one of $R_3$ and $R_4$ is an organic hydrophilic radical selected from the group consisting of

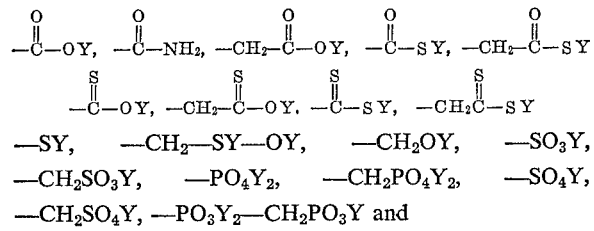

—SY, —CH$_2$—SY—OY, —CH$_2$OY, —SO$_3$Y,

—CH$_2$SO$_3$Y, —PO$_4$Y$_2$, —CH$_2$PO$_4$Y$_2$, —SO$_4$Y,

—CH$_2$SO$_4$Y, —PO$_3$Y$_2$—CH$_2$PO$_3$Y and

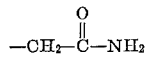

and Y is selected from the group consisting of hydrogen, a lower alkyl radical and a soluble salt-forming group.

3. The process of claim 1 wherein the volatilization inhibitor is added in an amount from about 0.10% to about 5.0% by weight.

4. The process of claim 1 wherein the normally volatile organic substance is selected from the group consisting of methanol, benzene, acetaldehyde, acetone, acetonitrile, acrolein, allyl chloride, diethylamine, diethyl ether, dioxane, epichlorohydrin, ethanol, ethyl chloride, furan, isopropanol, methyl ethyl ketone, methyl formate, trichloroethylene, trichloromonofluoromethane, trimethylamine, vinyl acetate, styrene, butanol, hexane, methyl salicylate, napthalene, para-dichlorobenzene and petroleum ether.

5. The process of claim 1 wherein the volatilization inhibitor has the general formula

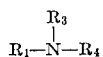

$R_1$ being an alkacyl radical of from about 8 to about 32 carbon atoms and $R_3$ and $R_4$ each being selected from the group consisting of —H and lower alkyl.

6. The process of claim 5 in which the volatilization inhibitor is oleylamide.

7. The process of claim 5 in which the volatilization inhibitor is a cocoamide composed primarily of $C_{12}$ and $C_{14}$ fatty acid amides.

8. The process of claim 5 in which the volatilization inhibitor is behenamide.

9. The process of claim 5 in which the volatilization inhibitor is stearamide.

10. The process of claim 5 in which the volatilization inhibitor is N,N-dimethyl myristamide.

11. The process of claim 5 in which the volatilization inhibitor is N,N-dimethyl stearamide.

12. The process of claim 5 in which the volatilization inhibitor is N,N-dimethyl oleylamide.

13. The process of claim 1 wherein the volatilization inhibitor has the general formula

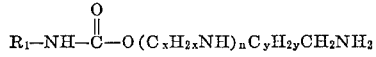

$R_1$ being an alkyl radical of from about 8 to about 32 carbon atoms, $x$ being an integer of from about 1 to about 6, $y$ being an integer of 0 to about 5, and $n$ being an integer of 0 to about 5.

14. The process of claim 13 wherein the volatilization inhibitor has the formula

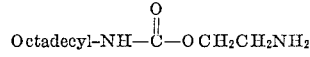

15. The process of claim 13 wherein the volatilization inhibitor has the formula

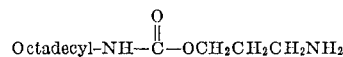

16. The process of claim 1 in which the normally volatile organic substance is a mixture of organic compounds.

17. The process of claim 16 in which the normally volatile organic substance is a volatile oil.

18. The process of claim 16 in which the normally volatile organic substance is an organic synthetic resin containing at least one volatile ingredient.

19. The process of claim 18 in which the resin is a polyester containing a styrene modifier.

20. A process for inhibiting volatilization of a normally volatile organic substance which comprises adding thereto from about 0.005% to about 10% by weight of a volatilization inhibitor having the general formula

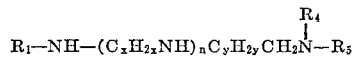

$R_1$ being an alkacyl radical of from about 8 to about 32 carbon atoms, $x$ being an integer of from about 1 to about 6, $y$ being an integer of 0 to about 5, $n$ being an integer of 0 to about 5, and $R_4$ and $R_5$ each being selected from the group consisting of hydrogen and lower alkyl.

21. The process of claim 20 wherein the volatilization inhibitor has the formula

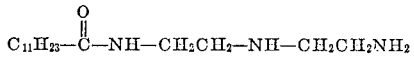

22. The process of claim 20 wherein the volatilization inhibitor has the formula

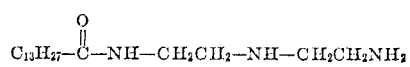

23. The process of claim 20 wherein the volatilization inhibitor has the formula

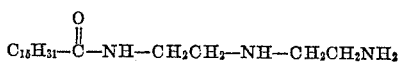

24. The process of claim 20 wherein the volatilization inhibitor has the formula

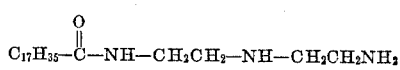

25. The process of claim 20 wherein the volatilization inhibitor has the formula

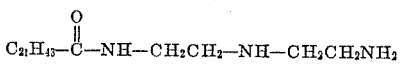

26. The process of claim 20 wherein the volatilization inhibitor has the formula

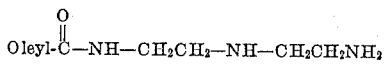

27. The process of claim 20 wherein the volatilization inhibitor has the formula

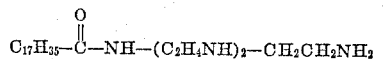

28. The process of claim 20 wherein the volatilization inhibitor has the formula

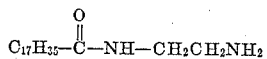

29. The process of claim 20 wherein the volatilization inhibitor has the formula

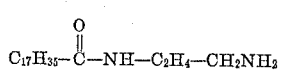

30. The process of claim 20 wherein the volatilization inhibitor has the formula

31. The process of claim 20 wherein the volatilization inhibitor has the formula

32. The process of claim 20 wherein the volatilization inhibitor has the formula

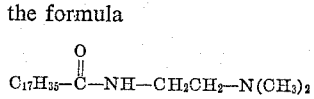

33. A process for inhibiting volatilization of a normally volatile organic substance which comprises adding thereto from about 0.005% to about 10% by weight of a volatilization inhibitor having the general formula $$R_1-NH-(C_xH_{2x}NH)_nC_yH_{2y}CH_2NH_2$$

$R_1$ being an alkyl radical of from about 8 to about 32 carbon atoms, $x$ being an integer of from about 1 to about 6, $y$ being an integer of 0 to about 5, and $n$ being an integer of 0 to about 5.

34. The process of claim 33 wherein the inhibitor has the formula $$R_1-NH-CH_2CH_2NH_2$$

and $R_1$ is an alkyl radical derived from tallow.

35. The process of claim 33 wherein the inhibitor has the formula $$R_1-NH-CH_2CH_2NH_2$$

and $R_1$ is an alkyl radical derived from coco fatty acids.

36. The process of claim 33 wherein the inhibitor has the formula $$R_1-NH-CH_2CH_2NH_2$$

and $R_1$ is a mixed $C_{16}-C_{22}$ radical.

37. The process of claim 33 wherein the inhibitor has the formula $$R_1-NH-CH_2CH_2NH_2$$

and $R_1$ is a mixed arachidyl-behenyl radical.

38. A process for inhibiting volatilization of a normally volatile organic substance which comprises adding thereto from about 0.005% to about 10% by weight of a volatilization inhibitor having the general formula $$R_1NH_2$$

and $R_1$ is an alkyl radical having from about 8 to about 32 carbon atoms.

39. The process of claim 38 wherein the volatilization inhibitor is coconut oil amine.

40. The process of claim 38 wherein the volatilization inhibitor is oleylamine.

41. The process of claim 38 wherein the volatilization inhibitor is an arachidyl-behenylamine.

42. A process for inhibiting volatilization of a normally volatile organic substance which comprises adding thereto from about 0.005% to about 10% by weight of a volatilization inhibitor having the general formula

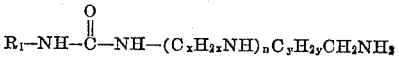

$R_1$ being an alkyl radical of from about 8 to about 32 carbon atoms, $x$ being an integer of from about 1 to about 6, $y$ being an integer of from 0 to about 5, and $n$ being an integer of from 0 to about 5.

43. The process of claim 42 wherein the volatilization inhibitor has the formula

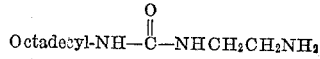

44. The process of claim 42 wherein the volatilization inhibitor has the formula

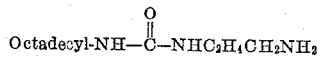

45. The process of claim 42 wherein the volatilization inhibitor has the formula

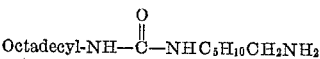

46. The composition of claim 42 wherein the volatilization inhibitor has the formula

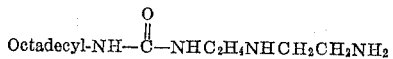

47. The process of claim 42 wherein the volatilization inhibitor has the formula

48. A process for inhibiting volatilization of a normally volatile organic substance which comprises adding thereto from about 0.005% to about 10% by weight of a volatilization inhibitor having the general formula

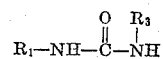

$R_1$ being an alkyl radical having from about 8 to about 32 carbon atoms and $R_3$ being a hydrophilic group.

49. The process of claim 48 wherein the volatilization inhibitor has the formula

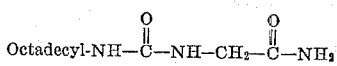

50. A stable, non-volatile, organic composition comprising a normally volatile, organic substance and from about 0.005% to about 10% by weight of a volatilization inhibitor having the general formula

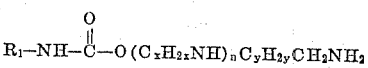

$R_1$ being an alkyl radical of from about 8 to about 32 carbon atoms, $x$ being an integer of from about 1 to about 6, $y$ being an integer of 0 to about 5, and $n$ being an integer of 0 to about 5.

51. The composition of claim 50 wherein the volatilization inhibitor has the formula $$\text{Octadecyl-NH}-\underset{\underset{O}{\parallel}}{C}-\text{O CH}_2\text{CH}_2\text{NH}_2$$

52. The composition of claim 50 wherein the volatilization inhibitor has the formula $$\text{Octadecyl-NH}-\underset{\underset{O}{\parallel}}{C}-\text{OCH}_2\text{CH}_2\text{CH}_2\text{NH}_2$$

53. A stable, non-volatile, organic composition comprising a normally volatile, organic substance and from about 0.005% to about 10% by weight of a volatilization inhibitor having the general formula $$R_1-\text{NH}-\underset{\underset{O}{\parallel}}{C}-\text{NH}-(C_xH_{2x}\text{NH})_n C_yH_{2y}\text{CH}_2\text{NH}_2$$

$R_1$ being an alkyl radical of from about 8 to about 32 carbon atoms, $x$ being an integer of from about 1 to about 6, $y$ being an integer of from 0 to about 5, and $n$ being an integer of from 0 to about 5.

54. The composition of claim 53 wherein the volatilization inhibitor has the formula $$\text{Octadecyl-NH}-\underset{\underset{O}{\parallel}}{C}-\text{NHCH}_2\text{CH}_2\text{NH}_2$$

55. The composition of claim 53 wherein the volatilization inhibitor has the formula $$\text{Octadecyl-NH}-\underset{\underset{O}{\parallel}}{C}-\text{NHC}_2\text{H}_4\text{CH}_2\text{NH}_2$$

56. The composition of claim 53 wherein the volatilization inhibitor has the formula $$\text{Octadecyl-NH}-\underset{\underset{O}{\parallel}}{C}-\text{NHC}_5\text{H}_{10}\text{CH}_2\text{NH}_2$$

57. The composition of claim 53 wherein the volatilization inhibitor has the formula $$\text{Octadecyl-NH}-\underset{\underset{O}{\parallel}}{C}-\text{NHC}_2\text{H}_4\text{NHCH}_2\text{CH}_2\text{NH}_2$$

58. The composition of claim 53 wherein the volatilization inhibitor has the formula $$\text{Octadecyl-NH}-\underset{\underset{O}{\parallel}}{C}-\text{NH}(C_2H_4\text{NH})_2\text{CH}_2\text{CH}_2\text{NH}_2$$

References Cited

UNITED STATES PATENTS

| | | | |
|---|---|---|---|
| 2,403,293 | 7/1946 | Miskel | 106—14 |
| 2,521,311 | 9/1950 | Schwoegler | 21—2.5 |
| 2,736,658 | 2/1956 | Pfohl | 106—14 |
| 2,739,871 | 3/1956 | Senkus | 21—2.5 |
| 2,758,086 | 8/1956 | Stuart et al. | 106—14 XR |
| 2,790,779 | 4/1957 | Spivack et al. | 106—14 XR |
| 2,805,135 | 9/1957 | Bell et al. | 44—66 |
| 2,839,372 | 6/1958 | Lindstrom et al. | 44—66 |
| 2,856,299 | 10/1958 | Westlund | 106—14 |
| 2,890,928 | 6/1959 | Osipowe | 21—2.7 |
| 2,919,979 | 1/1960 | Martin et al. | 44—66 |
| 2,928,727 | 3/1960 | Richards | 44—66 |
| 3,015,580 | 1/1962 | Zisman et al. | 106—14 XR |
| 3,084,034 | 4/1963 | Kalinowski | 44—66 |
| 2,867,672 | 1/1959 | Hemmerich | 260—666.5 |
| 2,609,931 | 9/1952 | Rodman | 210—62 |
| 2,094,367 | 9/1937 | Missbach | 23—250 |
| 2,671,048 | 3/1954 | Rosenwald | 196—29 |
| 2,413,257 | 12/1946 | Soday | 260—666.5 |
| 2,407,861 | 9/1946 | Wolk | 260—652.5 |
| 2,043,257 | 6/1936 | Missbach | 260—652.5 |

MORRIS O. WOLK, *Primary Examiner.*

S. ROSEN, J. ZATARGA, *Assistant Examiners.*